(12) United States Patent
Tamayo et al.

(10) Patent No.: US 9,552,835 B1
(45) Date of Patent: Jan. 24, 2017

(54) ACTUATOR LIMITERS FOR MULTIPLE DISK-STACK, SHARED ACTUATOR HARD DISK DRIVE

(71) Applicant: HGST Netherlands B.V., Amsterdam (NL)

(72) Inventors: Thomas Tamayo, Santa Clara, CA (US); Anant Shah, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 15/199,920

(22) Filed: Jun. 30, 2016

(51) Int. Cl.
*G11B 5/55* (2006.01)

(52) U.S. Cl.
CPC ............... *G11B 5/5521* (2013.01); *G11B 5/55* (2013.01)

(58) Field of Classification Search
CPC ............... G11B 5/55; G11B 5/54; G11B 21/08
USPC ................................. 360/265–265.6
See application file for complete search history.

(56) References Cited

U.S. PATENT DOCUMENTS

| | | | | |
|---|---|---|---|---|
| 6,115,215 A * | 9/2000 | Adams | ................... | G11B 5/553 360/264.4 |
| 6,134,076 A | 10/2000 | Boutaghou et al. | | |
| 6,628,469 B1 | 9/2003 | Hoyt | | |
| 7,154,711 B2 * | 12/2006 | Miyamoto | ............. | G11B 21/22 360/256.4 |
| 7,203,019 B1 * | 4/2007 | Liu | ........................... | G11B 5/54 360/256 |
| 8,958,172 B1 | 2/2015 | Hansen | | |
| 9,183,862 B1 * | 11/2015 | Shah | .................... | G11B 5/4806 |
| 9,218,833 B1 * | 12/2015 | Shah | ..................... | G11B 21/22 |
| 2005/0146848 A1 * | 7/2005 | Sheu | .................... | G11B 5/5521 361/679.33 |
| 2006/0044663 A1 * | 3/2006 | Stiles | ................. | G11B 17/0283 360/69 |
| 2010/0246070 A1 * | 9/2010 | Son | ...................... | G11B 5/6005 360/265.1 |
| 2011/0122528 A1 | 5/2011 | Burness | | |

OTHER PUBLICATIONS

Anant Shah et al., Actuator Limiters for Multiple Disk-Stack, Shared Actuator Hard Disk Drive, U.S. Appl. No. 15/199,892, filed by same Applicant/Assignee on same date herewith.

* cited by examiner

*Primary Examiner* — Allen T Cao
(74) *Attorney, Agent, or Firm* — John D. Henkhaus

(57) ABSTRACT

An actuator rotational limiter mechanism for a multiple disk-stack, shared actuator hard disk drive includes an actuator comb with a cam-lock feature and an actuator limiter with a rotatable cam-roller that is engagable with the cam-lock feature to temporarily hold in place the actuator comb. The cam-lock feature may be positioned at or near a middle location of a back arm of the actuator armature, where the actuator comb being held in place by the cam-roller corresponds to the head slider being positioned on a load/unload ramp between adjacent disk stacks.

15 Claims, 10 Drawing Sheets

DRIVE AN ACTUATOR COMB TO A FIRST END OF A CURVED SLOT OF AN ENCLOSURE BASE, SUCH THAT A PIN PROTRUDING FROM THE ACTUATOR COMB AND RIDING IN THE CURVED SLOT LIMITS ROTATIONAL TRAVEL OF THE ACTUATOR COMB TO A POSITION CORRESPONDING TO A HEAD SLIDER BEING POSITIONED AT OR NEAR THE INNER DIAMETER OF A FIRST DISK STACK
702

DRIVE THE ACTUATOR COMB TO A MIDWAY POSITION WITHIN THE CURVED SLOT, SUCH THAT THE PIN IS MAGNETICALLY ATTRACTED TO A MAGNET DISPOSED WITHIN OR ADJACENT TO THE CURVED SLOT, WHEREIN THE PIN HELD IN PLACE WITH THE MAGNET CORRESPONDS TO THE HEAD SLIDER BEING PARKED ON A LOAD/UNLOAD RAMP POSITIONED BETWEEN THE FIRST DISK STACK AND AN ADJACENT SECOND DISK STACK
704

DRIVE THE ACTUATOR COMB TO A SECOND END OF THE CURVED SLOT, SUCH THAT THE PIN RIDING IN THE CURVED SLOT LIMITS ROTATIONAL TRAVEL OF THE ACTUATOR COMB TO A POSITION CORRESPONDING TO THE HEAD SLIDER BEING POSITIONED AT OR NEAR THE INNER DIAMETER OF THE SECOND DISK STACK
706

FIG. 7

DRIVE AN ACTUATOR COMB TO ROTATE, THEREBY CAUSING A ROTATABLE CAM-ROLLER, FORCED INTO CONTACT WITH THE ACTUATOR COMB BY A LEAF SPRING STRUCTURE TO WHICH THE CAM-ROLLER IS AFFIXED, TO ROTATE, SUCH THAT THE CAM-ROLLER ENGAGES WITH A CAM-LOCK FEATURE OF THE ACTUATOR COMB, THEREBY TEMPORARILY HOLDING IN PLACE THE ACTUATOR COMB
1002

DRIVE THE ACTUATOR COMB TO FORCIBLY DISENGAGE THE CAM-ROLLER FROM THE CAM-LOCK FEATURE, THEREBY MOVING A HEAD SLIDER COUPLED TO THE ACTUATOR COMB TO A POSITION OVER A FIRST OR A SECOND DISK STACK
1004

FIG. 10

ACTUATOR LIMITERS FOR MULTIPLE DISK-STACK, SHARED ACTUATOR HARD DISK DRIVE

FIELD OF EMBODIMENTS

Embodiments of the invention may relate generally to magnetic recording devices and more particularly to limiting the actuator travel in a multiple disk-stack, shared actuator hard disk drive.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present goals of HDD design evolution, the cost per unit of storage is also an ever-present constraint associated with HDD development. The cost per storage capacity (or price per capacity from a user's standpoint) is especially important in large data storage scenarios, such as with archival and backup storage, in which large amounts of data are stored but infrequently accessed. One approach to increasing the storage capacity of an HDD while keeping the cost per capacity at a reasonable point is to utilize an HDD having multiple disk stacks while sharing an actuator among a plurality of the disk stacks. Thus, moving forward with a multiple disk-stack, shared actuator HDD leads to a need for controlling and limiting the travel of the actuator arms across the multiple disk stacks.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward actuator rotational limiter mechanisms configured for use in a multiple disk-stack, shared actuator hard disk drive (HDD), an HDD comprising such limiter mechanisms, and a method for controlling rotational travel of an actuator comb, whereby an actuator comb comprises a cam-lock feature and an actuator limiter comprises a rotatable cam-roller that is engagable with the cam-lock feature to temporarily hold in place the actuator comb. According to an embodiment, the cam-lock feature is positioned at or near a middle location of a back arm of the actuator armature, where the actuator comb being held in place by the cam-roller corresponds to the head slider being positioned on a load/unload ramp between adjacent disk stacks.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 7 is a flowchart illustrating a method for controlling an actuator comb in a multiple disk-stack, shared actuator hard disk drive, according to an embodiment;

FIG. 10 is a flowchart illustrating a method for controlling an actuator comb in a multiple disk-stack, shared actuator hard disk drive, according to an embodiment;

DETAILED DESCRIPTION

Approaches to actuator limiters for a multiple disk-stack, shared actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of a digital data storage device such as a hard disk drive (HDD). Thus, in accordance with an embodiment, a plan view illustrating an HDD 100 is shown in FIG. 1 to illustrate an exemplary operating context.

Figure 1:
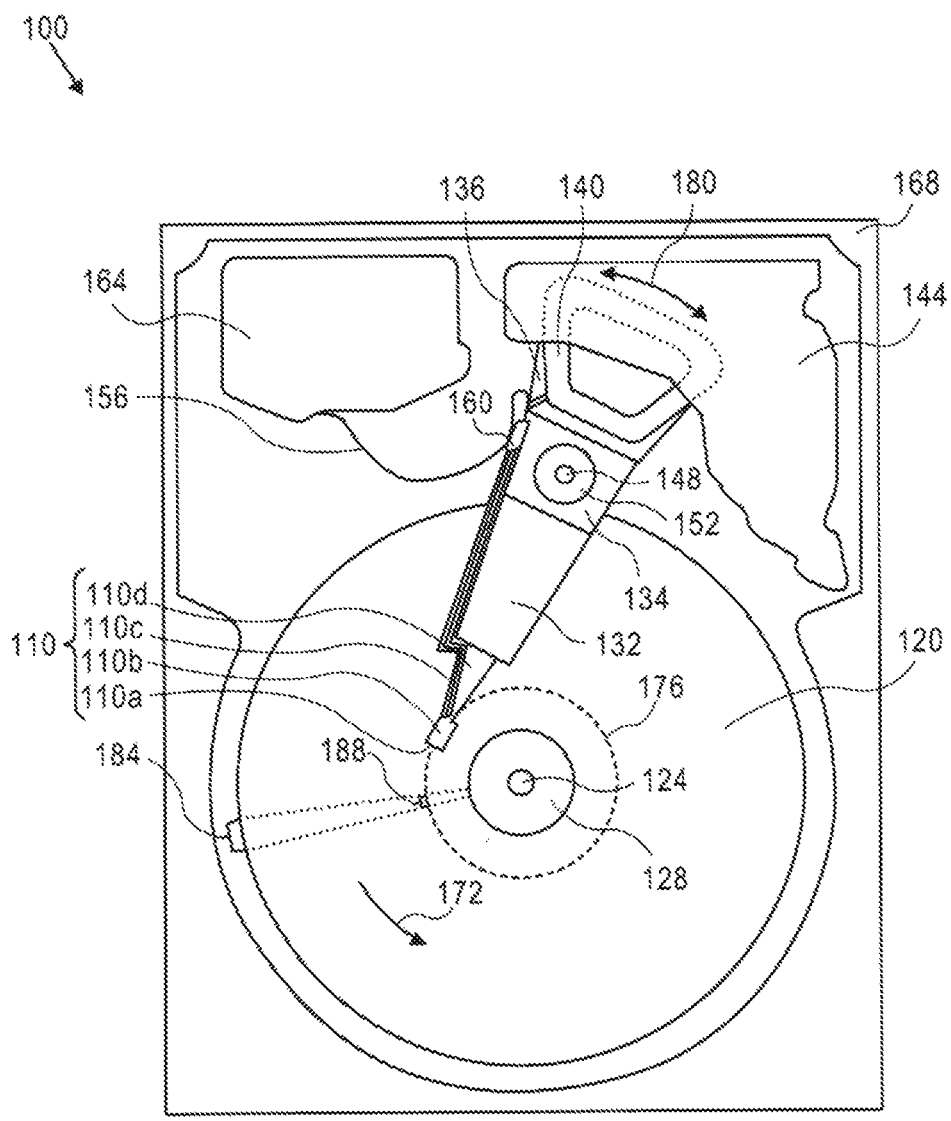
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or actuator comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam 110d to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As discussed, a multiple disk-stack, shared actuator HDD could benefit from approaches to controlling and limiting the travel of the actuator arms across the multiple disk stacks. For example, an approach to limit the rotational movement of a dual disk-stack, shared actuator at the inner diameter (ID) and the outer diameter (OD) of each disk stack, while allowing for smooth traversal between the disk stacks, could be helpful.

Multiple Disk-Stack, Shared Actuator Hard Disk Drive

Figure 2:
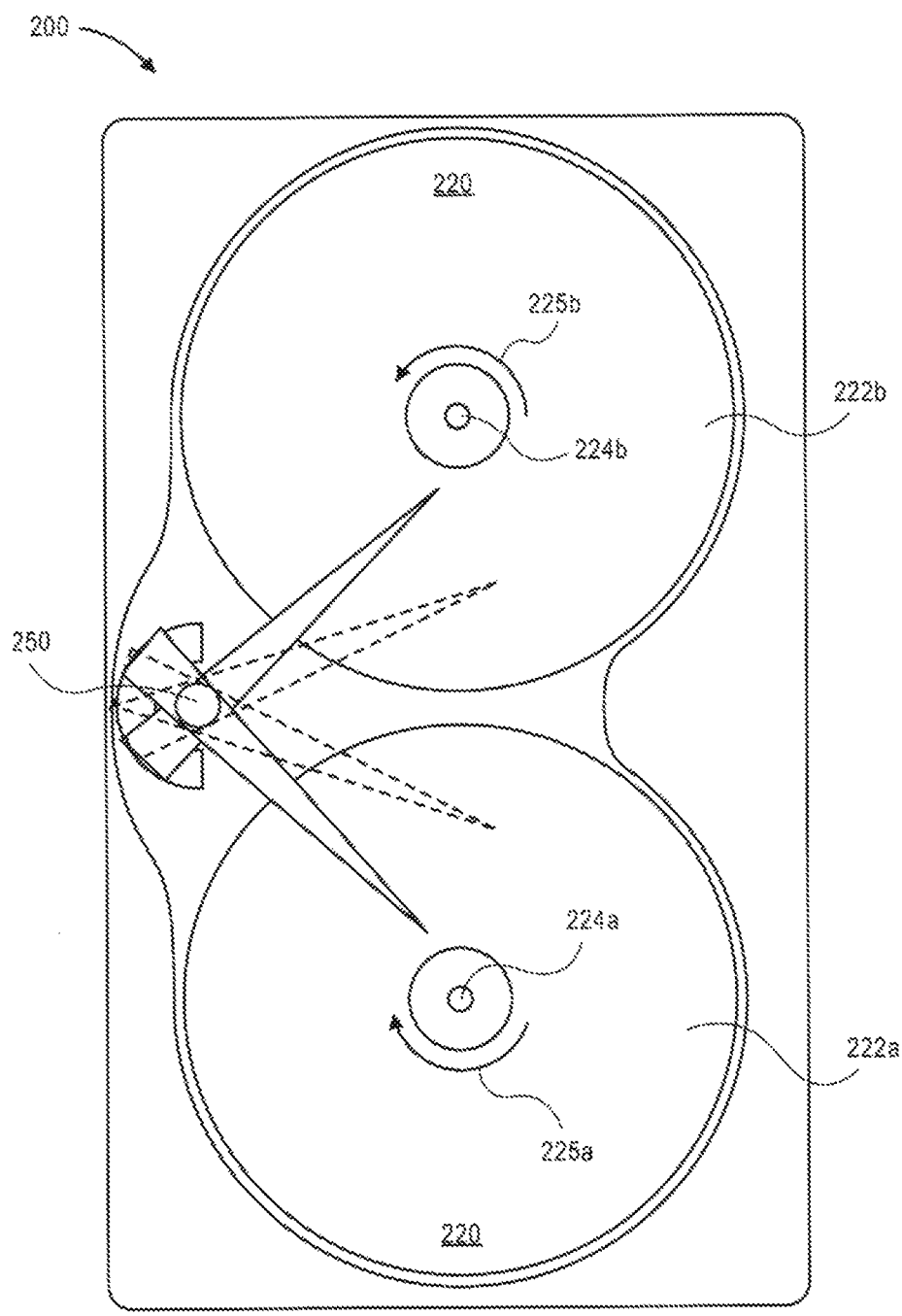
FIG. 2 is a plan view illustrating a two-disk-stack, single actuator HDD, according to an embodiment.

FIG. 2 is a plan view illustrating a two-disk-stack, single actuator HDD, according to an embodiment. With the exclusion of components and/or assemblies discussed hereafter, the internal components of HDD 200 are similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100. Furthermore, the HDD 200 of FIG. 2 is presented as a non-limiting example of an operating environment in which actuator limiter embodiments described herein may be implemented. However, the type of HDD or other data storage device for which such embodiments are utilized may vary from implementation to implementation.

One difference between HDD 200 and HDD 100 (FIG. 1) is that HDD 200 comprises two disk stacks, i.e., disk stack 222a and disk stack 222b, rather than the typical single disk stack. Each of disk stack 222a and 222b comprises one or more disk 220. Preferably but not by way of limitation, each disk stack 222a and 222b would comprise multiple disks, such as a non-limiting example of ten disks 220 per disk stack 222a, 222b, to provide for a large storage capacity HDD. The one or more disks 220 of each disk stack 222a, 222b are coupled to and rotated by respective spindles, i.e., spindle 224a and spindle 224b.

According to an embodiment, spindle 224a rotates disk stack 222a in one direction while spindle 224b rotates disk stack 222b in the opposite direction. For example, disk stack 222a may rotate in a clockwise direction 225a while disk stack 222b may rotate in a counter-clockwise direction 225b. Thus, with the capability to rotate in opposite directions the disk(s) 220 can generate airflow in both rotational directions so that the head slider is able to maintain its flying angle of attack relative to the rotational airflow over the disk(s) 220 corresponding to each disk stack 222a, 222b. Disk stack 222a and disk stack 222b may rotate simultaneously or may rotate asynchronously. According to an alternative embodiment, each spindle 224a, 224b may rotate its respective disk stack 222a, 222b in the same direction and the head slider would be appropriately positioned over the disk(s) 220 of each disk stack 222a, 222b for read operations and write operations.

Notably, HDD 200 comprises a single head stack assembly (HSA) 250 to service the disks 220 of both disk stack 222a and disk stack 222b. HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156. The rotational stroke of HSA 250 may be greater than is typical with a conventional HDD voice coil actuator, such as with HDD 100 (FIG. 1), in order to be able to service the two adjacent disk stacks 222a, 222b. According to an embodiment, the actuator portion of HSA 250 is configured to move the head slider in an arc of approximately 90 degrees, to reach all the data tracks of disks 220 of both disk stack 222a and disk stack 222b.

Generally, embodiments described herein address the challenge with parking the heads at a load/unload ramp during transport and handling of the drive, along with enhancing the control of movement of the actuator between two disk packs using servo control procedures.

Actuator Comb for a Multiple Disk-Stack, Shared Actuator Disk Drive

Figure 3:
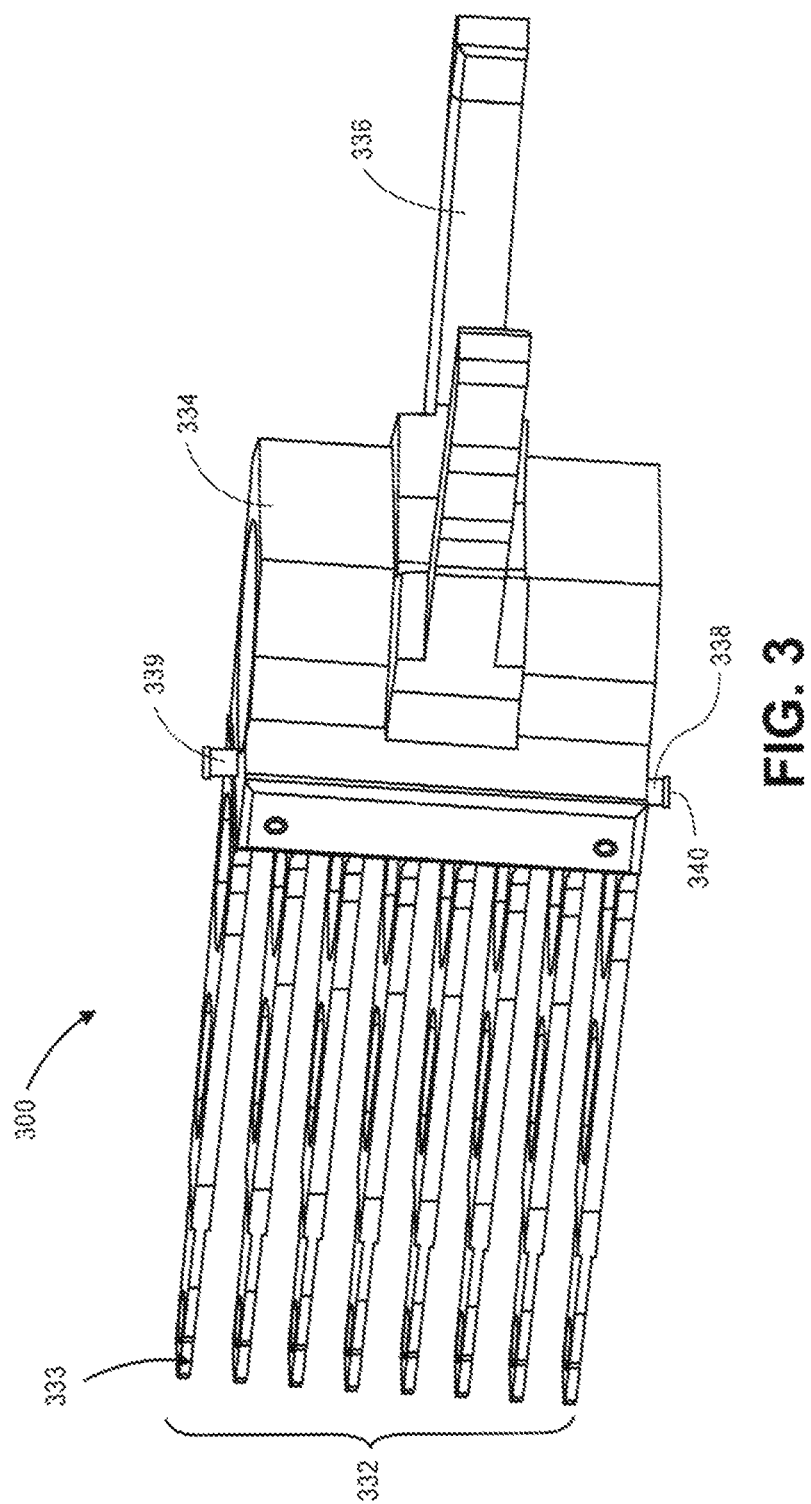
FIG. 3 is a side view of an actuator comb, according to an embodiment.

FIG. 3 is a side view of an actuator comb, according to an embodiment. Actuator comb 300 comprises a carriage 334, a plurality of actuator arms 332, and an armature 336 connected thereto (commonly fabricated as a unitary part). Typically, a head gimbal assembly (e.g., HGA 110 of FIG. 1), including a flexure to which the head slider (e.g., read-write head 110a housed in slider 110b of FIG. 1) is coupled, is attached at a distal end 333 of each actuator arm 332, possibly with a load beam 110d (FIG. 1) therebetween. A VCM (voice-coil motor) voice coil (not shown here; e.g., voice coil 140 of FIG. 1) is typically housed by the armature 336 and, in conjunction with a stator (e.g., stator 144 of FIG. 1) including a voice-coil magnet, generally constitutes the VCM.

According to an embodiment, actuator comb 300 comprises a pin 338 protruding therefrom. According to an embodiment, pin 338 is a magnetic pin (i.e., made at least in part of magnetic material), for magnetic interaction with a corresponding magnet coupled with an HDD enclosure base, as is described in more detail elsewhere herein. Note that the pin 338, being magnetic, may be constructed of a different material than the actuator comb 330, generally, and the armature 336, specifically. Hence, the magnetic pin 338 may need to be a separate part from, and attached to or assembled with the actuator comb as part of a manufacturing process.

According to an embodiment, and as depicted in FIG. 3, pin 338 protrudes from a bottom surface of actuator comb 300. Thus, the pin 338 may ride, travel, move in a corresponding curved slot of the enclosure base (see, e.g., curved slot 404 of FIG. 4), such that rotation of the actuator comb 300 is limited by the pin 338 riding within the curved slot 404. According to an embodiment, actuator comb 300 comprises an elastomer sleeve 340 (e.g., rubber) encasing at least a portion of the pin 338, which can absorb the impact force as the actuator presses to the left or right "crash stop" locations, or slot ends, embodied in the curved slot 404.

According to an embodiment, actuator comb 300 comprises a balancing mass 339 protruding from a top surface of the actuator comb 300, if needed to maintain the balance and/or dynamic properties of the actuator comb in view of the presence of pin 338 protruding from the bottom surface of the actuator comb 300.

Enclosure Base for a Multiple Disk-Stack, Shared Actuator Disk Drive

Figure 4:
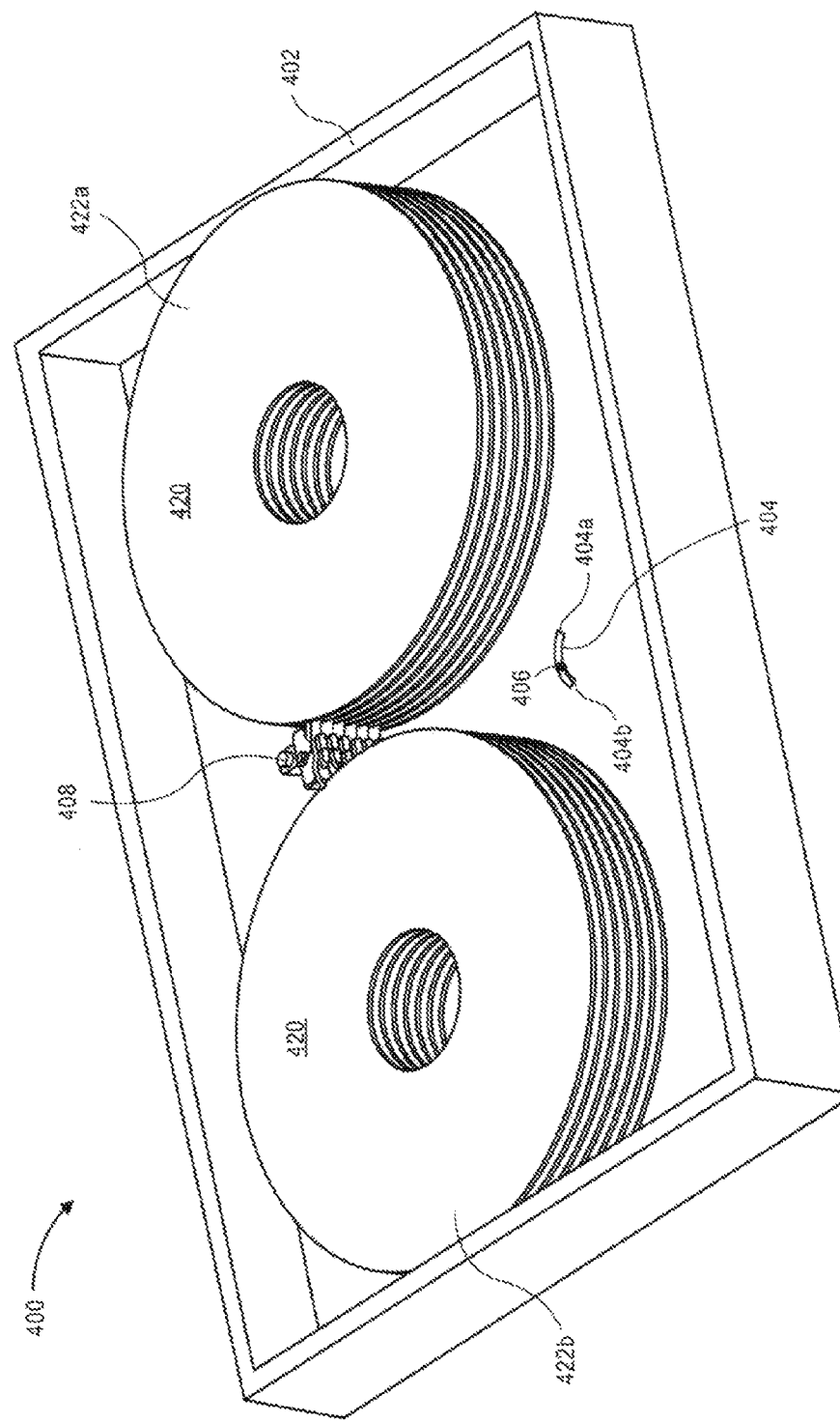
FIG. 4 is a top perspective view illustrating a simplified two-disk-stack, single actuator HDD with an actuator rotational limiter mechanism, according to an embodiment.

FIG. 4 is a top perspective view illustrating a simplified two-disk-stack, single actuator HDD with an actuator rotational limiter mechanism, according to an embodiment. With the exclusion of components and/or assemblies discussed hereafter, the internal components of HDD 400 are similar to or the same as like components of HDD 200 (FIG. 2) and HDD 100 (FIG. 1). Thus, for the purposes of clarity and simplicity, such like components are not necessarily depicted in FIG. 4 or described again in reference to FIG. 4. Reference is made to FIG. 1 and the corresponding description for the showing and description of the components of HDD 400 that are like components of HDD 100.

HDD 400 comprises two disk stacks, i.e., disk stack 422a (or "right disk stack") and disk stack 422b (or "left disk stack") housed in an enclosure base 402 (or simply "base 402"), with each disk stack 422a and 422b comprising one or more disk(s) 420. Preferably but not by way of limitation, each disk stack 422a and 422b would comprise multiple disks to provide for a large storage capacity HDD. The one or more disk(s) 420 of each disk stack 422a, 422b are coupled to and rotated by respective spindles (not shown here). According to an embodiment, disk stack 422a rotates in one direction while disk stack 422b rotates in the opposite direction, thus generating airflow in both rotational directions so that the head slider is able to maintain its flying angle of attack relative to the rotational airflow over the disk(s) 420 corresponding to each disk stack 422a, 422b. As with HDD 200 (FIG. 2), HDD 400 comprises a single head stack assembly (not shown here) having a suitable rotational stroke to service the disk(s) 420 of both disk stack 422a and disk stack 422b.

According to an embodiment, base 402 comprises a curved slot 404, which has a right end 404a (or "right crash stop") and a left end 404b (or "left crash stop"). The curved slot 404 is configured and positioned so that the pin 338 (FIG. 3) of actuator comb 300 (FIG. 3) can be disposed and ride, travel, move therein. As such, the range of rotational travel of the actuator comb 300 is limited by the pin 338 riding in the curved slot 404.

Furthermore, the right end 404a of the curved slot 404 acts as a right crash stop (i.e., a mechanical stop) for the pin 338 and, therefore, also for the actuator comb 300. Hence, the pin 338 being in contact with the right end 404a corresponds to the head slider (e.g., read-write head 110a housed in slider 110b of FIG. 1) being positioned at or near the inner diameter of the left disk stack 422b, according to an embodiment. Stated otherwise, the head slider cannot be rotated beyond a desired location over the disk stack 422b (i.e., the "first disk stack") because the rotation of actuator comb 300 is limited by contact between the pin 338 and the right end 404a of curved slot 404. Similarly, the left end 404b of the curved slot 404 acts as a left crash stop (i.e., a mechanical stop) for the pin 338 and, therefore, also for the actuator comb 300. Hence, the pin 338 being in contact with the left end 404b corresponds to the head slider being positioned at or near the inner diameter of the right disk stack 422a, according to an embodiment. Stated otherwise, the head slider cannot be rotated beyond a desired location over the disk stack 422a (i.e., the "second disk stack") because the rotation of actuator comb 300 is limited by contact between the pin 338 and the left end 404b of curved slot 404.

Figure 5:
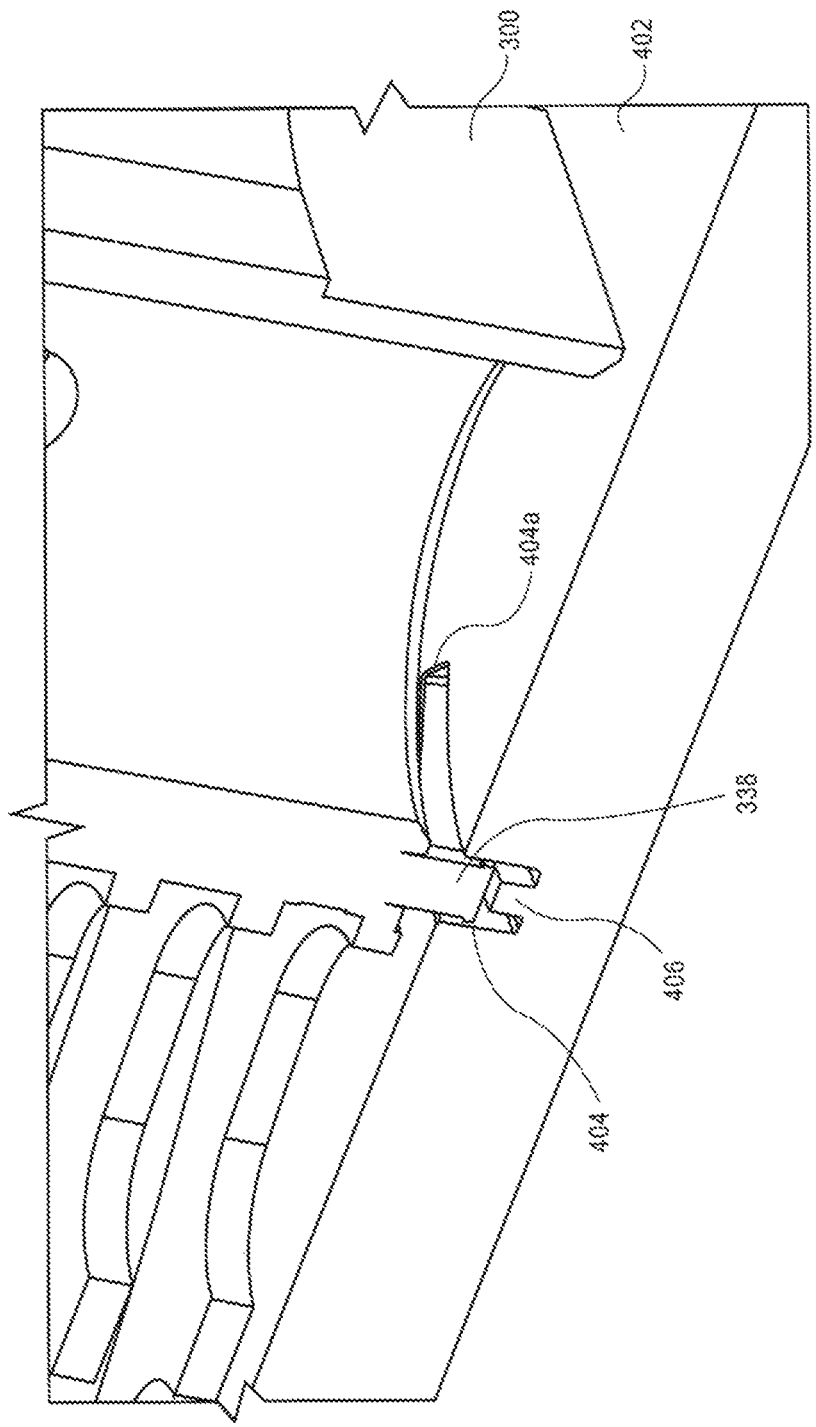
FIG. 5 is a cross-sectional perspective view illustrating an interface between an actuator comb of FIG. 3 and a base of FIG. 4, according to an embodiment.

FIG. 5 is a cross-sectional perspective view illustrating an interface between an actuator comb of FIG. 3 and a base of FIG. 4, according to an embodiment.

According to an embodiment, and with reference to FIGS. 4 and 5, base 402 comprises a magnet 406 disposed within, or adjacent to (including beneath), the curved slot 404. According to an embodiment, the magnet 406 is positioned at a substantially midway (or middle) location along the arc of the curved slot 404, such as depicted in FIG. 4. According to an embodiment, the pin 338 of actuator comb 300 is composed at least in part of a magnetic material and, therefore, the magnetic pin 338 would magnetically interact with the magnet 406 when the pin 338 is riding in the curved slot 404. Consequently, the rotation of the actuator comb 300 is limited by a magnetic attraction between the magnetic pin 338 of actuator comb 300 and the magnet 406 of base 402. That is, the magnetic pin 338 and, therefore, the actuator comb 300, may at times be held in place with or by the magnet 406, according to an embodiment.

With reference to FIG. 4, HDD 400 may further comprise a load/unload ramp 408. Thus, in a configuration in which the magnet 406 is positioned midway along the curved slot 404, the magnetic pin 338 of the actuator comb 300 being held in place by attraction with the magnet 406 of the base 402 corresponds to the head slider being parked on the ramp 408. Therefore, while the actuator comb 300 travel (and the actuator, generally) is limited at each respective disk stack 422a, 422b inner diameter by the left and right ends 404b, 404a of curved slot 404, the actuator travel is also limited at the ramp (e.g., midway between the adjacent disk stacks 422a, 422b) by the magnetic attraction force between the magnetic pin 338 of actuator comb 300 and the magnet 406 on the base 402, whereby controlled traversal between disk packs 422a, 422b is allowed by varying the VCM torque to overcome such magnetic attraction when desired or necessary.

Note that the position of the pin 338 (FIGS. 3, 5) may vary from implementation to implementation. For example, rather than pin 338 protruding from the carriage 334 (FIG. 3) of the actuator comb 300 (FIG. 3) at a location between the pivot shaft 148/pivot bearing assembly 152 (FIG. 1) and the arms 332, the pin 338 may be positioned to protrude from the carriage 334 of the actuator comb 300 at a location between the pivot shaft 148/pivot bearing assembly 152 (FIG. 1) and the armature 336. If the pin is positioned between the pivot shaft 148/pivot bearing assembly 152 (FIG. 1) and the armature 336, the travel arc of the pin would be reversed (because the pin would be on the opposing side of the pivot) and, therefore, the arc of the curved slot 404 (FIGS. 4, 5) would likewise need to be reversed.

The embodiments described herein are described in the context of a two disk-stack HDD, however, the concepts and principles underlying the described embodiments may be modified to operate in the context of an HDD having more than two disk stacks. For example, the length of the curved slot may be lengthened and one or more magnets added in order to operate in the context of an actuator servicing more than two disk stacks with a respective ramp between each pair of adjacent disk stacks.

Alternative Pin-Magnet Configurations

Figure 6:
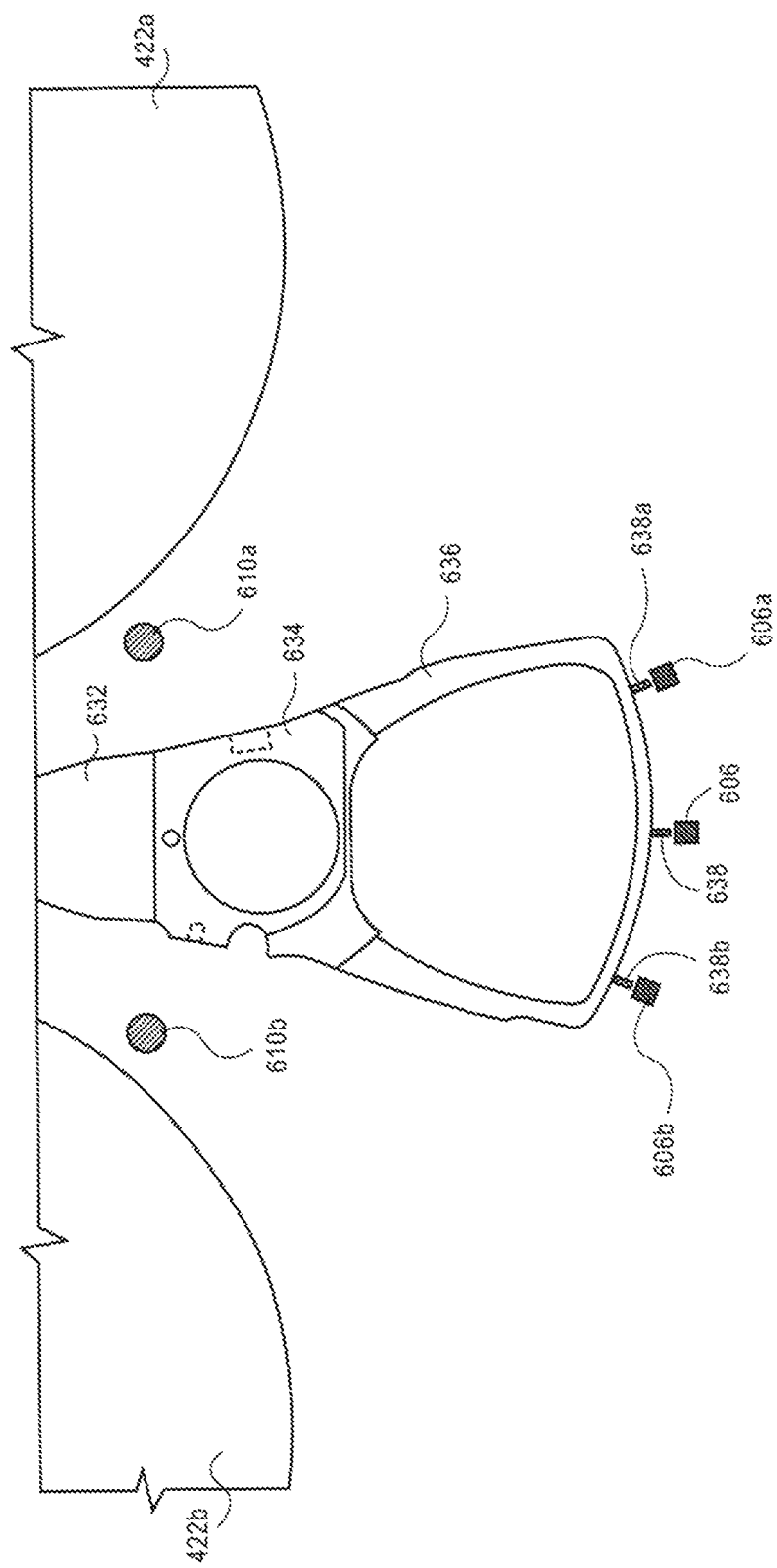
FIG. 6 is a top view illustrating a portion of a two-disk-stack, single actuator HDD with an actuator rotational limiter mechanism, according to an embodiment.

FIG. 6 is a top view illustrating a portion of a two-disk-stack, single actuator HDD with an actuator rotational limiter mechanism, according to an embodiment. HDD 600 comprises the disk stacks 422a, 422b, and a common actuator carriage 634, arms 632, and armature 636 positioned therebetween. Alternatively to the structural configurations described in reference to FIGS. 3-5, a magnetic pin 638 may protrude from a back-facing surface 637 of an armature 636, according to an embodiment. In the case of an open-backed armature (e.g., similar to armature 336 of FIG. 3), the magnetic pin 638 may be affixed to the coil of the VCM, for example. The position of magnetic pin 638 along the back surface 637 may vary from implementation to implementation, with alternative examples depicted as pin 638a to the right and pin 638b to the left.

Correspondingly, the enclosure base houses a magnet 606, which aligns with the magnetic pin 638 when the actuator is in a neutral position between disk stack 422a and 422b, i.e., when the head slider is parked on a load/unload ramp (e.g., ramp 408 of FIG. 4). Furthermore, similarly to the magnetic pin 638, the position of magnet 606 in/on the base may also vary from implementation to implementation, with alternative examples depicted as magnet 606a to the right and magnet 606b to the left.

With a configuration as illustrated and described in reference to FIG. 6, crash stop posts 610a, 610b are coupled with the base. The crash stop posts 610a, 610b function as a mechanical limit to the actuator movement at the disk inner diameter, while utilizing the pin 638/magnet 606 mechanism to limit the actuator at the parked position. As such, the actuator arm 632 or carriage 634 being in contact with the left crash stop post 610b (the "first crash stop post") corresponds to the head slider being positioned at or near the inner diameter of the left disk stack 422b (the "first disk stack"), and the actuator arm 632 or carriage 634 being in contact with the right crash stop post 610a (the "second crash stop post") corresponds to the head slider being positioned at or near the inner diameter of the right disk stack 422a (the "second disk stack").

Method for Controlling Rotational Travel of an Actuator Comb

FIG. 7 is a flowchart illustrating a method for controlling an actuator comb in a multiple disk-stack, shared actuator hard disk drive, according to an embodiment. The embodiments described in reference to FIG. 7 may each be performed using the components described in reference to FIGS. 3-5, for example. The method depicted in FIG. 7 may be implemented as one or more sequences of instructions stored in a memory, for execution by one or more processors. However, the manner in which the logic is implemented may vary from implementation to implementation. For non-limiting examples, the one or more sequences of instructions may be implemented as firmware stored in ROM or in hardware circuitry. Furthermore, the processing may be implemented for operation in an electronic component, for non-limiting examples, an HDD preamplifier, hard disk controller electronics, read-channel electronics, write-channel electronics, a system-on-a-chip (SOC) integrating one or more of the foregoing, and the like. The manner in which the executing electronics are configured may vary from implementation to implementation. Therefore, the memory in which the one or more sequences of instructions are stored, and the one or more processors which execute the instructions, may both/all reside on a single electronic component, e.g., an integrated circuit board, or may reside on separate electronic components or otherwise separately.

At block 702, an actuator comb is driven to a first end of a curved slot of an enclosure base, such that a pin protruding from the actuator comb and riding in the curved slot limits rotational travel of the actuator comb to a position corresponding to a head slider (coupled with or attached to the actuator comb) being positioned at or near the inner diameter of a first disk stack. For example, actuator comb 300 (FIGS. 3, 5) is driven, e.g., by way of a drive signal from a HDD controller, to the right end 404a (FIGS. 4, 5) of the curved slot 404 (FIGS. 4, 5) of an enclosure base 402 (FIGS. 4, 5), such that the pin 338 (FIGS. 3, 5) protruding from the actuator comb 300 and riding in the curved slot 404 limits rotational travel of the actuator comb 300 to a position corresponding to a head slider (e.g., read-write head 110a housed in slider 110b of FIG. 1) being positioned at or near the inner diameter of the left disk stack 422b.

At block 704, the actuator comb is driven to a midway position within the curved slot, such that the pin is magnetically attracted to a magnet disposed within or adjacent to the curved slot, where the pin being held in place with the magnet corresponds to the head slider being parked on a load/unload ramp positioned between the first disk stack and an adjacent second disk stack. For example, actuator comb 300 is driven, e.g., by way of a drive signal from a HDD controller, to a midway position within the curved slot 404, such that the pin 338 is magnetically attracted to the magnet 406 (FIGS. 4, 5) disposed within or adjacent to the curved slot 404, where the pin 338 being held in place with the magnet 406 corresponds to the head slider being parked on the load/unload ramp 408 positioned between the first disk stack 422b and an adjacent right disk stack 422a. As such, a mechanism is provided to avoid overshooting the ramp when parking at the neutral position.

At block 706, the actuator comb is driven to a second end of the curved slot, such that the pin riding in the curved slot limits rotational travel of the actuator comb to a position corresponding to the head slider being positioned at or near the inner diameter of the second disk stack. For example, actuator comb 300 is driven, e.g., by way of a drive signal from a HDD controller, to the left end 404b (FIG. 4) of the curved slot 404, such that the pin 338 riding in the curved slot 404 limits rotational travel of the actuator comb 300 to a position corresponding to the head slider being positioned at or near the inner diameter of the right disk stack 422a.

In addition to providing a magnetic hold mechanism for the actuator comb at the neutral position, the foregoing method may provide more control of the actuator comb when traveling between adjacent disk stacks even if it is not desirous to stop and park on the ramp. Thus, the magnetic hold system, including the strength of the magnetic attraction, can be "tuned" appropriately to correspond to a desired control, in view of or in conjunction with the VCM and associated servo profiles.

Cam-Roller Hold Mechanism as Extension to Magnetic-Hold Actuator Limiter

Figure 11A:
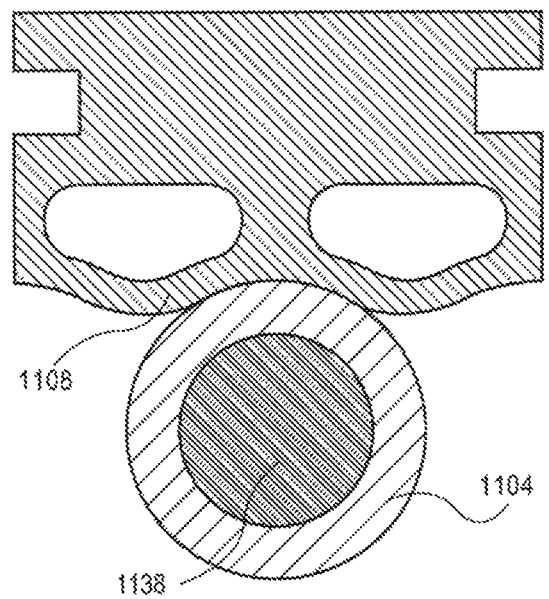
FIG. 11A is a top view illustrating a cam-roller mechanism, according to an embodiment.
Figure 11B:
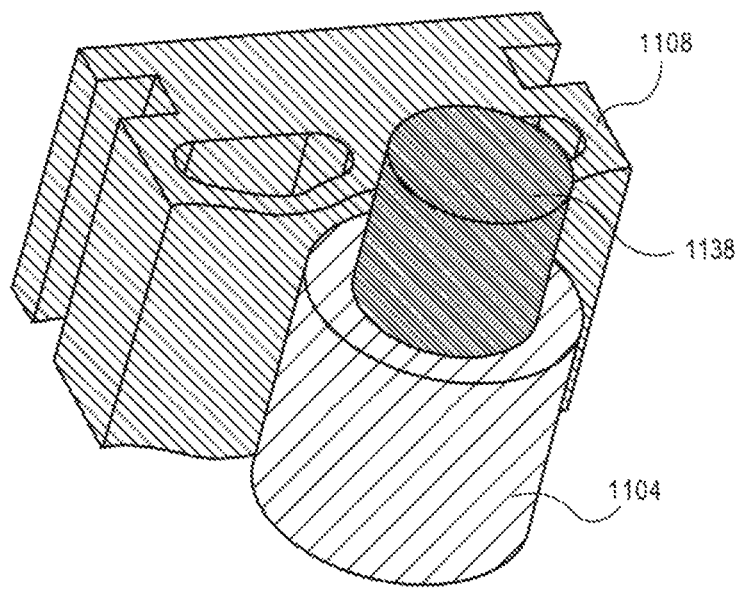
FIG. 11B is a perspective view illustrating the cam-roller mechanism of FIG. 11A, according to an embodiment.

FIG. 11A is a top view illustrating a cam-roller mechanism, and FIG. 11B is a perspective view illustrating the cam-roller mechanism of FIG. 11A, both according to an embodiment. Referring to the foregoing embodiments described in reference to FIGS. 3-5 as a "magnetic-hold actuator limiter", the structure and embodiments described in reference to FIGS. 11A, 11B may be considered an optional extension to the magnetic-hold actuator limiter. For example, in scenarios in which more stringent shock requirements are present, such as with a mobile HDD, the cam-roller mechanism described in reference to FIGS. 11A, 11B may be implemented to augment the magnetic-hold actuator limiter in order to provide an additional mechanical actuator hold mechanism.

FIGS. 11A, 11B depict a cam-roller hold mechanism comprising a rotatable cam-roller 1104 in which a magnetic pin 1138 is disposed, and which is engagable with a cam-lock feature 1108. According to an embodiment, the magnetic pin 1138 protrudes from the bottom (or top) surface of an actuator comb such as actuator comb 300 (FIG. 3), possibly replacing the pin 338 (FIG. 3) of actuator comb 300. Similar to pin 338, magnetic pin 1138 may ride, travel, move in a corresponding curved slot of the enclosure base (see, e.g., curved slot 404 of FIG. 4), such that rotation of the actuator comb 300 is limited by the pin 1138 riding within the curved slot 404.

As with the embodiments described in reference to FIGS. 4 and 5, an HDD enclosure base such as base 402 comprises a magnet 406 disposed within, or adjacent to (including beneath), the curved slot 404. According to an embodiment, the magnetic pin 1138 would magnetically interact with the magnet 406 when the pin 1138 is riding in the curved slot 404. Consequently, the rotation of the actuator comb 300 is limited by a magnetic attraction between the magnetic pin 1138 of actuator comb 300 and the magnet 406 of base 402. That is, the magnetic pin 1138 and, therefore, the actuator comb 300, may at times be held in place with or by the magnet 406, according to an embodiment.

According to an embodiment, the cam-lock feature 1108 is positioned within or adjacent to a curved slot of the enclosure base (e.g., curved slot 404 of FIG. 4), such that the arcuate cam portion of cam-lock feature 1108 protrudes into or overhangs the curved slot 404. In addition to the magnetic hold provided by the magnetic pin 1138 in conjunction with the magnet 406, the magnetic pin 1138 is disposed within a cam-roller 1104 (for a non-limiting example, constructed of plastic) which, when engaged with the relatively compliant cam lock feature 1108 (for a non-limiting example, constructed of an elastomer being softer and more compliant than the cam-roller 1104), can further hold in place an actuator comb such as actuator comb 300 (FIG. 3). For example, the dual hold (magnetic and mechanical) mechanisms may be used to hold the head slider in a neutral, idle position, e.g., on a load/unload ramp (e.g., ramp 408 of FIG. 4) between two adjacent disk-stacks of a multiple disk-stack, shared actuator HDD (e.g., disk stacks 222a, 222b of HDD 200 of FIG. 2).

Cam-Locking Mechanism for a Multiple Disk-Stack, Shared Actuator Disk Drive

Figure 8:
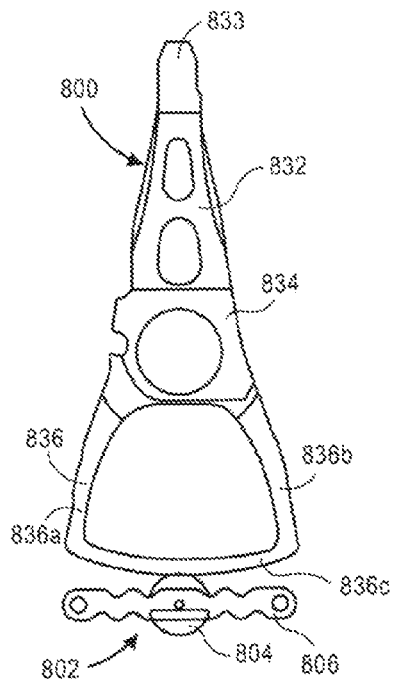
FIG. 8 is a top view illustrating an actuator and actuator rotational limiter mechanism, according to an embodiment.

FIG. 8 is a top view illustrating an actuator and actuator rotational limiter mechanism, according to an embodiment. An actuator comb 800 comprises a carriage 834, a plurality of actuator arms 832, and an armature 836 connected thereto (commonly fabricated as a unitary part). Typically, a head gimbal assembly (e.g., HGA 110 of FIG. 1), including a flexure to which the head slider (e.g., read-write head 110a housed in slider 110b of FIG. 1) is coupled, is attached at a distal end 833 of each actuator arm 832, possibly with a load beam 110d (FIG. 1) therebetween. A VCM (voice-coil motor) voice coil (not shown here; e.g., voice coil 140 of FIG. 1) is typically housed by the armature 336 and, in conjunction with a stator (e.g., stator 144 of FIG. 1) including a voice-coil magnet, generally constitutes the VCM. Here, the armature 836 has a closed shape, having a left arm 836a, a right arm 836b, and a back arm 836c interconnecting the left and right arms 836a, 836b.

Figure 9A:
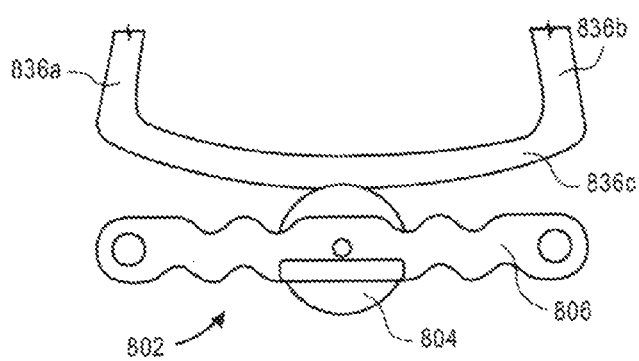
FIG. 9A is a top view illustrating the actuator rotational limiter mechanism of FIG. 8, according to an embodiment.
Figure 9B:
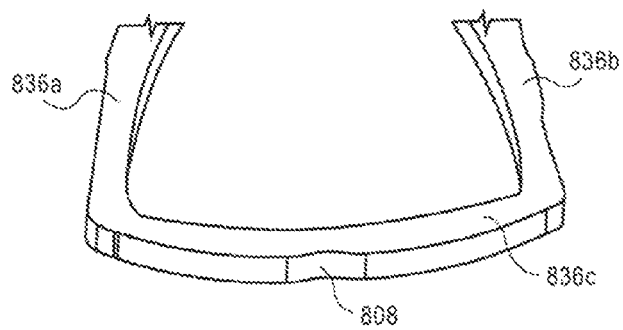
FIG. 9B is a top perspective view illustrating the back arm of the actuator of FIG. 8, according to an embodiment.

According to an embodiment, actuator comb 800 further comprises a cam-lock feature, which is described in more detail in reference to FIGS. 9A, 9B (see, e.g., cam-lock feature 808 of FIG. 9B). Also introduced in FIG. 8 is a actuator limiter mechanism 802, which is also described in more detail in reference to FIGS. 9A, 9B (see, e.g., cam-roller 804 of FIG. 9A).

FIG. 9A is a top view illustrating the actuator rotational limiter mechanism of FIG. 8, and FIG. 9B is a top perspective view illustrating the back arm of the actuator of FIG. 8, both according to embodiments. FIG. 9A provides a closer view of the actuator limiter mechanism 802 while FIG. 9B provides a closer view of the armature 836.

Actuator limiter 802 comprises a rotatable cam-roller 804, that is engagable with a cam-lock feature 808 of armature 836 which, when engaged, can temporarily hold in place the actuator comb 800. According to an embodiment, the actuator limiter 802 further comprises a leaf spring structure 806, to which the cam-roller 804 is rotatably coupled (e.g., by a pin). Thus, a force provided by the leaf spring structure 806 is able to hold the cam-roller 804 in contact with the armature 836 of the actuator comb 800. Hence, as the actuator comb 800 rotates, such as in response to a VCM drive signal, the cam-roller 804 of the actuator limiter 802 is caused and driven to rotate, due generally to the mechanical/contact friction between the back arm 836c of armature 836 and the cam-roller 804. Note that in the configuration depicted, in which back arm 836c is arcuate, rotation of the actuator comb may cause the leaf spring structure 806 to flex and the cam-roller 804 to translate in a direction generally normal to the length of the lead spring structure 806. Therefore, space should be provided for some movement of the actuator limiter 802 mechanism.

According to an embodiment, the cam-lock feature 808 can generally be characterized as a divot in/on the back surface of the back arm 836c of armature 836, as generally depicted in FIG. 9B. It is the mechanical/physical engagement between the cam-roller 804 of actuator limiter 802 and the cam-lock feature 808 of the armature 836 of the actuator comb 800 that can temporarily hold in place the actuator comb 800. According to an embodiment, the cam-lock feature 808 is positioned at or near the middle or midway position of the back arm 836a or armature 836 and, therefore, the actuator comb 800 being held in place by the cam-roller 804 corresponds to the head slider being neutrally positioned, e.g., on a load/unload ramp (e.g., ramp 408 of FIG. 4) between two adjacent disk-stacks of a multiple disk-stack, shared actuator HDD (e.g., disk stacks 222a, 222b of HDD 200 of FIG. 2). Furthermore, implementations in which armature 836 lacks a back arm 836c (i.e., an open armature) are contemplated and are within the scope of the present embodiments, whereby the cam-lock feature 808 may reside on the back surface of a voice coil rather than the back surface of the back arm 836c.

The manner in which the actuator limiter 802 is fixed in an HDD or other data storage device may vary from implementation to implementation. For example and according to one embodiment, the leaf spring structure 806 of actuator limiter 802 is affixed to an HDD enclosure base (e.g., HDD housing 168 of FIG. 1). For another example and according to another embodiment, the leaf spring structure 806 of actuator limiter 802 is affixed to a voice coil motor (VCM) magnet housing plate (e.g., stator 144 of FIG. 1).

Furthermore, the location at which the actuator limiter 802 is positioned in an HDD or other data storage device may vary from implementation to implementation. For example and according to one embodiment, the actuator limiter 802 is positioned in an area outside of the area enclosed by the armature 836, such as depicted in FIGS. 8 and 9A. However, implementations in which the actuator limiter 802 is positioned within the enclosed by the armature 836 are contemplated and are within the scope of embodiments. In such a scenario, the cam-lock mechanism 808 may reside on a front surface of a back portion of a voice coil (not shown here; e.g., voice coil 140 of FIG. 1) rather than the back surface of the back arm 836c.

Method for Controlling Rotational Travel of an Actuator Comb

FIG. 10 is a flowchart illustrating a method for controlling an actuator comb in a multiple disk-stack, shared actuator hard disk drive, according to an embodiment. The embodiments described in reference to FIG. 10 may each be performed using the components described in reference to FIGS. 8-9B, for example. The method depicted in FIG. 10 may be implemented as one or more sequences of instructions stored in a memory, for execution by one or more processors. However, the manner in which the logic is implemented may vary from implementation to implementation. For non-limiting examples, the one or more sequences of instructions may be implemented as firmware stored in ROM or in hardware circuitry. Furthermore, the processing may be implemented for operation in an electronic component, for non-limiting examples, an HDD pre-amplifier, hard disk controller electronics, read-channel electronics, write-channel electronics, a system-on-a-chip (SOC) integrating one or more of the foregoing, and the like. The manner in which the executing electronics are configured may vary from implementation to implementation. Therefore, the memory in which the one or more sequences of instructions are stored, and the one or more processors which execute the instructions, may both/all reside on a single electronic component, e.g., an integrated circuit board, or may reside on separate electronic components or otherwise separately.

At block 1002, an actuator comb is driven to rotate, thereby causing a rotatable cam-roller, which is forced into contact with the actuator comb by a leaf spring structure to which the cam-roller is affixed, to rotate, such that the cam-roller engages with a cam-lock feature of the actuator comb, thereby temporarily holding the actuator comb in place. For example, actuator comb 800 (FIGS. 8, 9A) is driven (e.g., by way of a drive signal from a HDD controller) to rotate, thereby causing the rotatable cam-roller 804 (FIGS. 8, 9A), which is forced into contact with the actuator comb 800 by a leaf spring structure 806 (FIGS. 8, 9A) to which the cam-roller 804 is affixed, to rotate, such that the cam-roller 804 engages with a cam-lock feature 808 (FIG. 9B) of the actuator comb 800, thereby temporarily holding the actuator comb 800 in place. According to an embodiment, the actuator comb 800 being held in place by engagement of the cam-roller 804 with the cam-lock 808 corresponds to the head slider being neutrally positioned, e.g., on a load/unload ramp (e.g., ramp 408 of FIG. 4) between two adjacent disk-stacks of a multiple disk-stack, shared actuator HDD (e.g., disk stacks 222a, 222b of HDD 200 of FIG. 2).

For example, and according to embodiments, holding the actuator comb 800 in place may be in response to reducing the drive signal (e.g., reducing the signal power, voltage, current, and the like) to the actuator voice coil (e.g., voice coil 140 of FIG. 1), or may be in response to substantially ending transmission of the drive signal to the actuator voice coil, thereby allowing the cam-roller 804 to settle in the cam-feature 808. "Substantially ending" the drive signal may allow for some weak signal to remain, for example, just not enough to drive the voice coil effectively.

At block 1004, the actuator comb is driven to forcibly disengage the cam-roller from the cam-lock feature, thereby moving a head slider coupled to the actuator comb to a position over a first or second disk stack of the multiple disk stacks. For example, actuator comb 800 is driven (e.g., by way of a drive signal from a HDD controller) to forcibly disengage the cam-roller 804 from the cam-lock feature 808, thereby moving a head slider (e.g., read-write head 110a housed in slider 110b of FIG. 1) coupled to the actuator comb 800 to a position over a first disk stack (e.g., disk stack 222a of FIG. 2) or a second disk stack (e.g., disk stack 222b of FIG. 2).

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A multiple disk-stack, shared actuator hard disk drive comprising:
    an enclosure base;
    a first disk media stack rotatably mounted on a first spindle;
    a second disk media stack rotatably mounted on a second spindle;
    a head slider comprising a read/write head configured to read from and to write to a disk medium;
    an actuator comb configured to move said head slider to access portions of at least one disk medium of said first disk media stack and at least one disk medium of said second disk media stack, said actuator comb comprising:
        an armature housing a voice coil and comprising a left arm, a right arm, and a back arm interconnecting said left arm and said right arm,
        a cam-lock feature; and an actuator limiter comprising:
    a rotatable cam-roller that engages with said cam-lock feature and thereby temporarily holds in place said actuator comb.

2. The hard disk drive of claim 1, wherein said actuator limiter further comprises:
    a leaf spring structure to which said cam-roller is rotatably coupled, wherein said leaf spring structure holds said cam-roller in contact with said armature of said actuator comb;
    wherein rotation of said actuator comb causes rotation of said cam-roller.

3. The hard disk drive of claim 2, wherein said leaf spring structure is affixed to said base.

4. The hard disk drive of claim 2, further comprising:
    a voice coil motor (VCM) magnet housing plate;
    wherein said leaf spring structure is affixed to said magnet housing plate.

5. The hard disk drive of claim 1, wherein said cam-lock feature comprises a divot in a back surface of said back arm of said armature.

6. The hard disk drive of claim 5, wherein said cam roller is positioned outside of an area enclosed by said armature.

7. The hard disk drive of claim 1, wherein said cam-lock feature comprises a divot in said voice coil.

8. The hard disk drive of claim 7, wherein said cam roller is positioned inside of an area enclosed by said armature.

9. The hard disk drive of claim 7, wherein said cam roller is positioned outside of an area enclosed by said armature.

10. The hard disk drive of claim 1, further comprising:
    a load/unload ramp coupled with said base;
    wherein said cam-lock feature is positioned at or near a midway location of said back arm of said armature, and wherein said actuator comb held in place by said cam-roller corresponds to said head slider being positioned on said ramp.

11. A method for controlling rotational travel of an actuator comb housing a head slider in a multiple disk-stack, shared actuator hard disk drive, the method comprising:
    driving said actuator comb to rotate, thereby causing a rotatable cam-roller, forced into contact with said actuator comb by a leaf spring structure to which said cam-roller is affixed, to rotate, such that said cam-roller engages with a cam-lock feature of said actuator comb, thereby temporarily holding in place said actuator comb.

12. The method of claim 11, wherein said holding in place is in response to reducing a drive signal, to said actuator, corresponding to said driving.

13. The method of claim 11, wherein said holding in place is in response to substantially ending a drive signal, to said actuator, corresponding to said driving.

14. The method of claim 11, wherein said actuator comb held in place by engagement of said cam-roller with said cam-lock feature corresponds to said head slider being positioned on a load/unload ramp positioned between a first disk stack and an adjacent second disk stack.

15. The method of claim 11, further comprising:
    driving said actuator comb to forcibly disengage said cam-roller from said cam-lock feature, thereby moving said head slider to a position over a disk from a first disk stack or a disk from an adjacent second disk stack.

* * * * *

UNITED STATES PATENT AND TRADEMARK OFFICE
CERTIFICATE OF CORRECTION

| | | Page 1 of 2 |
|---|---|---|
| PATENT NO. | : 9,552,835 B1 | |
| APPLICATION NO. | : 15/199920 | |
| DATED | : January 24, 2017 | |
| INVENTOR(S) | : Tamayo et al. | |

It is certified that error appears in the above-identified patent and that said Letters Patent is hereby corrected as shown below:

In the Specification

At Column 7, Line 52 through Column 8, Line 7, replace the text with the following text:

Furthermore, the right end 404a of the curved slot 404 acts as a right crash stop (i.e., a mechanical stop) for the pin 338 and, therefore, also for the actuator comb 300. Hence, the pin 338 being in contact with the right end 404a corresponds to the head slider (e.g., read-write head 110a housed in slider 110b of FIG. 1) being positioned at or near the inner diameter of the right disk stack 422a, according to an embodiment. Stated otherwise, the head slider cannot be rotated beyond a desired location over the disk stack 422a (i.e., the first disk stack) because the rotation of actuator comb 300 is limited by contact between the pin 338 and the right end 404a of curved slot 404. Similarly, the left end 404b of the curved slot 404 acts as a left crash stop (i.e., a mechanical stop) for the pin 338 and, therefore, also for the actuator comb 300. Hence, the pin 338 being in contact with the left end 404b corresponds to the head slider being positioned at or near the inner diameter of the left disk stack 422b, according to an embodiment. Stated otherwise, the head slider cannot be rotated beyond a desired location over the disk stack 422b (i.e., the second disk stack) because the rotation of actuator comb 300 is limited by contact between the pin 338 and the left end 404b of curved slot 404.

At Column 10, Lines 4-47, replace the text with the following text:

At block 702, an actuator comb is driven to a first end of a curved slot of an enclosure base, such that a pin protruding from the actuator comb and riding in the curved slot limits rotational travel of the actuator comb to a position corresponding to a head slider (coupled with or attached to the actuator comb) being positioned at or near the inner diameter of a first disk stack. For example, actuator comb 300 (FIGS. 3, 5) is driven, e.g., by way of a drive signal from a HDD controller, to the right end 404a (FIGS. 4, 5) of the curved slot 404 (FIGS. 4, 5) of an enclosure base 402 (FIGS. 4, 5), such that the pin 338 (FIGS. 3, 5) protruding from the actuator comb 300 and riding in the curved slot 404 limits rotational travel of the actuator comb 300 to a position corresponding to a head slider (e.g., read-write head 110a housed in slider 110b of FIG. 1) being positioned at or near the inner diameter of the right disk stack 422a.

Signed and Sealed this
Ninth Day of October, 2018

Andrei Iancu
*Director of the United States Patent and Trademark Office*

At block 704, the actuator comb is driven to a midway position within the curved slot, such that the pin is magnetically attracted to a magnet disposed within or adjacent to the curved slot, where the pin being held in place with the magnet corresponds to the head slider being parked on a load/unload ramp positioned between the first disk stack and an adjacent second disk stack. For example, actuator comb 300 is driven, e.g., by way of a drive signal from a HDD controller, to a midway position within the curved slot 404, such that the pin 338 is magnetically attracted to the magnet 406 (FIGS. 4, 5) disposed within or adjacent to the curved slot 404, where the pin 338 being held in place with the magnet 406 corresponds to the head slider being parked on the load/unload ramp 408 positioned between the first disk stack 422a and an adjacent left disk stack 422b. As such, a mechanism is provided to avoid overshooting the ramp when parking at the neutral position.

At block 706, the actuator comb is driven to a second end of the curved slot, such that the pin riding in the curved slot limits rotational travel of the actuator comb to a position corresponding to the head slider being positioned at or near the inner diameter of the second disk stack. For example, actuator comb 300 is driven, e.g., by way of a drive signal from a HDD controller, to the left end 404b (FIG. 4) of the curved slot 404, such that the pin 338 riding in the curved slot 404 limits rotational travel of the actuator comb 300 to a position.